United States Patent [19]

Gunsing

[11] Patent Number: 5,137,498
[45] Date of Patent: Aug. 11, 1992

[54] CONTINUOUSLY VARIABLE TRANSMISSION WITH A REGULABLE PUMP

[75] Inventor: Johannes T. G. Gunsing, Eindhoven, Netherlands

[73] Assignee: Van Doorne's Transmissie B.V., Tilburg, Netherlands

[21] Appl. No.: 698,625

[22] Filed: May 10, 1991

[30] Foreign Application Priority Data

Mar. 5, 1991 [NL] Netherlands .................. 9100391

[51] Int. Cl.$^5$ ............................................. F16H 63/00
[52] U.S. Cl. ...................................... 474/28; 474/18
[58] Field of Search ............ 474/8, 18, 28, 69, 70; 74/865–867

[56] References Cited

U.S. PATENT DOCUMENTS 4,533,340  8/1985  Abo et al. ........................ 474/18 X 4,735,597  4/1988  Cadée ............................... 474/28

FOREIGN PATENT DOCUMENTS

3727633A1  3/1989  Fed. Rep. of Germany .
1-135956   5/1989  Japan .

Primary Examiner—Thuy M. Bui
Attorney, Agent, or Firm—Pennie & Edmonds

[57] ABSTRACT

A continuously variable transmission provided with a primary pulley mounted on a primary shaft and a secondary pulley mounted on a secondary shaft. A transmission is passed over said pulleys. Both the primary pulley and the secondary pulley comprise a pair of discs. At least one of said discs is axially movable by a hydraulic cylinder, so as to adjust the position of the transmission around the pulleys and thus the transmission ratio of the transmission. The pump for providing fluid for said hydraulic cylinders has a regulable delivery, so as to enhance the transmission efficiency.

21 Claims, 3 Drawing Sheets

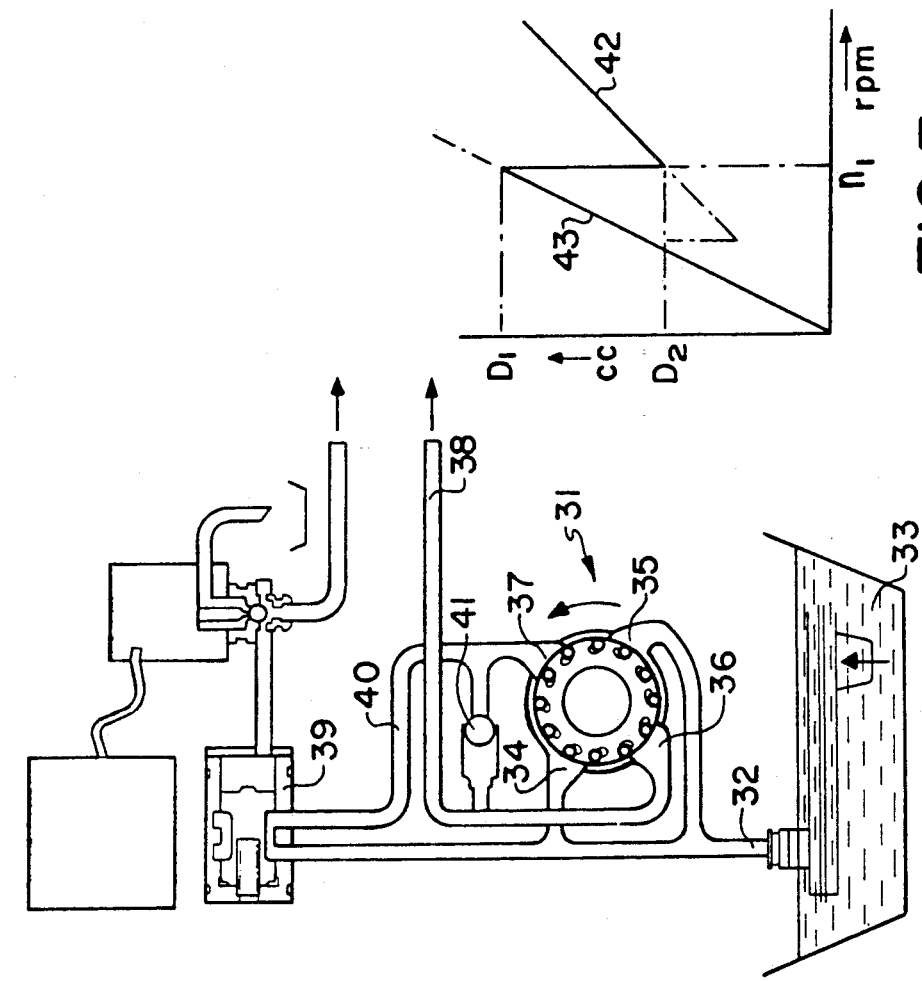
FIG. 3a
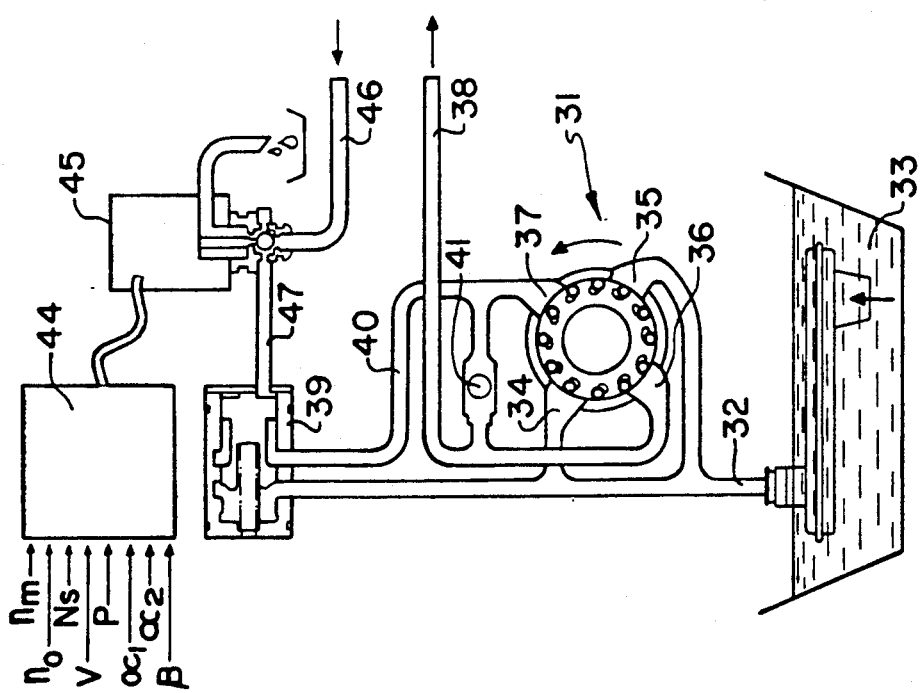
FIG. 3b
FIG. 3c

CONTINUOUSLY VARIABLE TRANSMISSION WITH A REGULABLE PUMP

The invention relates to a continuously variable transmission provided with a primary pulley mounted on a primary shaft and a secondary pulley mounted on a secondary shaft, both the primary pulley and the secondary pulley comprising a pair of discs, at least one of said discs being axially movable by means of a hydraulic cylinder so as to adjust the transmission ratio, with a transmission means passed over the pulleys, as well as with a pump for providing a fluid for said hydraulic cylinder.

Such a continuously variable transmission is known from European Patent Specification No. 0,011,342, and is in particular used in vehicles, but has other applications as well. The transmission ratio of the transmission is adjusted by the axial movement of at least of the discs of the pulleys, as a result of which the effective radius of the transmission means between the pulleys is changed and the transmission ratio is changed accordingly. The axial movement of the discs is effected by means of hydraulic cylinders, which are fed with fluid by a pump. The pressure and/or the delivery of the fluid should at all times be such that the required axial movement of the discs is achieved, whilst moreover the transmission means is clamped between the pulleys in such a manner that no slip can occur between the transmission means and the pulleys. On the basis of this the required pressure and/or the delivery of the fluid supplied by the pump may strongly vary during operation of the transmission, dependent on the operating condition of the transmission. The pump of the known transmission is always selected such that a sufficiently large pressure and/or delivery is provided by the pump at all times. A disadvantage of the known transmission is thereby that for many operating conditions the pump is strongly overdimensioned and is thus responsible for a substantial loss of efficiency of the transmission.

The object of the invention is to overcome the drawbacks of the known continuously variable transmission and provide a continuously variable transmission which has an improved efficiency. In order to accomplish that objective the continuously variable transmission according to the invention is characterized in that the pump has a regulable delivery.

By using a pump with a regulable delivery the delivery of the pump can at all times be adapted to the specific momentaneous operating condition of the continuously variable transmission. As a result of that the pump is no longer overdimensioned and the efficiency of the transmission will be enhanced, because the regulated pump delivery will at all times be as much as possible adapted to the required delivery, as a result of which transmission losses due to the pump power taken is strongly reduced.

The pump used according to the invention is preferably a continuously variable pump (e.g. a vanes pump, an axialradial plunger pump, a pump having internal or external teeth), but it may also be regulable in steps. The pump which is regulable in steps may be assembled of parallel pump parts, or be multi-polar. The pump parts or pump poles may thereby be arranged in such a manner that the pump parts/poles each have a different delivery.

According to a further elaboration of the invention the continuously variable transmission is provided with control means which control the pump delivery independently of the operating conditions of the transmission. Important operating conditions within this framework are the speeds of the primary and/or secondary shaft, as well as decelerations and/or accelerations thereof, whether or not in their mutual ratios. When the transmission is used in a vehicle, data such as vehicle speed, acceleration, deceleration, accelerator pedal position and brake pedal position as well as their derivatives in time can be used accordingly advantageously.

The control means may be mechanical, hydraulic or electronic means, as well as combinations thereof. The electronic control means preferably also comprise selection means, whereby mutually different data are stored in the memory thereof, said data relating to a certain optimum choice with regard to the manner of regulating the pump delivery in relation to the operating conditions of the transmission.

With pumps assembled from parallel pump parts and with multi-polar pumps the control means may advantageously comprise a control valve which is disposed in a connecting line between the inlet and outlet of the pump part/pole. By opening casu quo closing the control valve the pipe between the inlet and outlet opening of the pump part/pole is opened casu quo closed, as a result of which, when the control valve is opened, there is no longer a pressure difference between the inlet and the outlet and said pump part/pole is disconnected, whilst when the control valve is closed said pump part/pole is completely operative and contributes towards the pump delivery that is provided. This may be used to selectively connect the pump part or the pump pole. According to the invention the control valve may furthermore be regulated directly or indirectly by an on-/off solenoid.

The invention will be explained with reference to a drawing. In the drawing:

FIG. 3a shows an embodiment of the invention having two poles, both of them connected;

FIG. 3b shows the embodiment according to FIG. 3a, with one pump pole connected and one pump pole disconnected;

FIG. 3c shows a possible pump characteristic (pump delivery in dependence of the rpm) for the pump according to FIGS. 3a, 3b;

Figure 1:
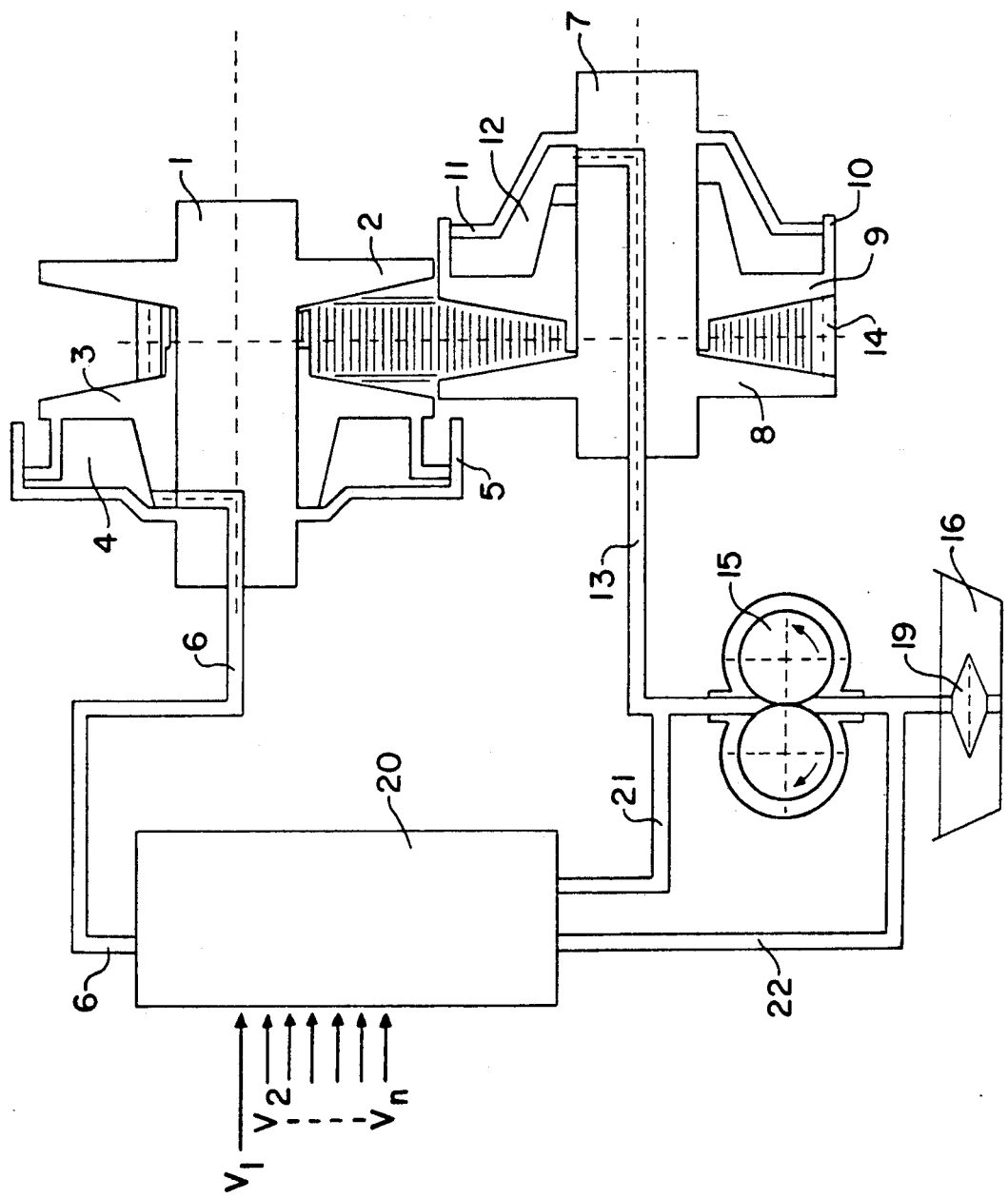
FIG. 1 shows a continuously variable transmission with a pump according to prior art.

FIG. 1 shows a hydraulic/mechanical continuously variable transmission such as is known from European Patent Specification No. 0,011,342. It will be apparent, however, that the invention may be used correspondingly in other types of continuously variable transmissions which are controlled by electronic, hydraulic or other means. The continuously variable transmission according to FIG. 1 will be discussed within this framework so as to elucidate the continuously variable transmission per se.

The continuously variable transmission comprises a primary shaft 1, e.g. driven by a motor of a vehicle, and has a fixed and an axially movable conical disc 2, 3, which together form the primary pulley. The disc 3 comprises the piston of cylinder 5 comprising the cylinder space 4, and may be axially moved by supplying and discharging fluid via the line 6. Furthermore a secondary shaft 7 is present, which is e.g. connected to the wheels of a vehicle so as to drive the vehicle, and which is likewise provided with a fixed and an axially movable conical disc 8, 9, together forming the secondary pulley. The disc 9 is integrally connected to the cylinder 10, in which the piston 11 having a fixed connection to the secondary shaft 7 is present, so that the cylinder space 12 is enclosed. Via the line 13 fluid can be supplied to and discharged from the cylinder space 12. An endless transmission means 14, such as a thrust belt, chain or different driving belt is passed over the primary and the secondary pulley. By axially moving the conical discs 3 and 9 the radii of the transmission means 14, and thus the transmission ratio may be varied. The axial movement of the conical discs is effected by supplying or discharging fluid to or from the cylinder spaces 4 and 11. The pressure of the fluid in the cylinder space 11 is used to exert sufficient pressure on the endless transmission means 14, in order to prevent slip of the transmission means between the secondary and the primary pulley in this manner. The pressure and the delivery in the lines 6 and 13 to the cylinder spaces 4 and 12 are regulated by a control unit 20. This control unit may be a hydraulic, electronic or mechanical control unit, or a combination thereof. The required pressures and deliveries can be regulated by the control unit 20, on the basis of a multitude of variables (V1−Vn) such as the transmission ratio, the speed of the primary/secondary shaft, the vehicle speed, accelerations and decelerations of the vehicle, accelerator pedal position etc. The control unit 20 is fed, via a line 21 coupled to the line 13, by a pump 15 sucking in fluid, e.g. from a reservoir 16 via a filter 19. The pump thereby puts the fluid under a certain pressure. Any excess fluid is discharged by the control unit via the line 22.

Figure 2:
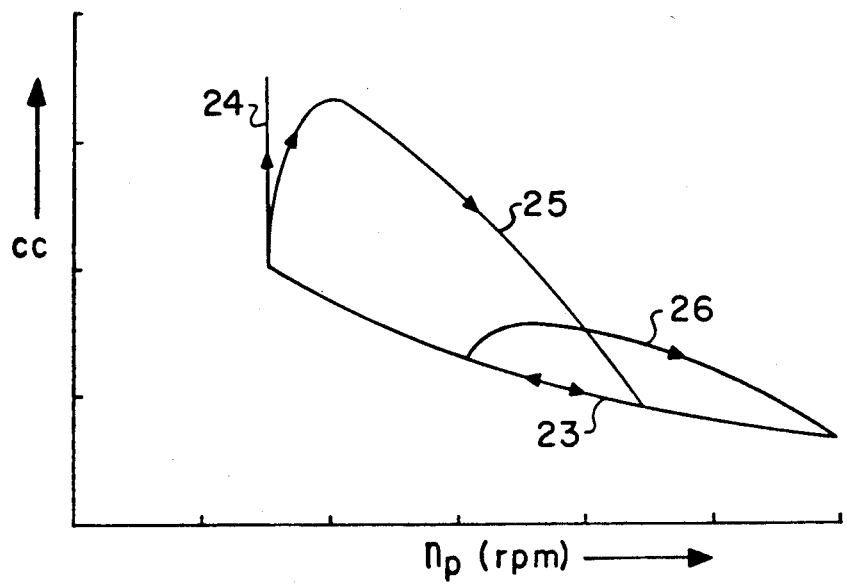
FIG. 2 shows a diagram with a delivery requirement of the transmission in dependence on the rpm and specific operating conditions.

The pump delivery required for the pressure on the transmission means and for controlling the transmission ratio of the continuously variable transmission varies strongly, dependent on the operating conditions of the transmission. A few examples of operating conditions in combination with the pump delivery in dependence on the rpm of the primary shaft are shown in FIG. 2. Normal driving conditions are indicated by the line 23. The pump delivery which is required thereby remains relatively low across the entire rpm. Line 24 indicates the course of the required pump delivery in case of an an emergency stop. The required pump delivery strongly increases thereby, since the transmission must change down very quickly in order to make it possible to drive off quickly again, which may be required for safety reasons. Also with so-called "kick-down" actions, when the accelerator pedal is depressed completely, e.g. when overtaking a vehicle, a substantial delivery is required, both in the low rpm range (line 25) and in the high rpm range (line 26).

In order to be able to provide an adequate delivery at all times, under all operating conditions, the pump according to prior art, such as e.g. described in European Patent Specification No. 0,001,342, is selected such that the pump delivery is larger than the maximum delivery required. This means that the known pump is strongly overdimensioned and that substantial efficiency losses occur in the transmission, because in practically all operating conditions the pump circulates more fluid than is necessary.

According to the invention this may be overcome by using a pump with a regulable delivery, such as a continuously variable pump or a pump which is variable in steps, e.g. a composite pump or a multi-polar pump.

FIG. 3 shows an embodiment of the invention having a bipolar roller vanes pump 31. The pump 31 sucks fluid from the reservoir 33 via the line 32 by means of two inlets 34, 35, and discharges medium via outlets 36 and 37 respectively. In the roller vanes pump, whose operation is considered to be known, the fluid between the inlet 34 and the outlet 36, as well as between the inlet 35 and the outlet 37, is pressurized. The pump 31 may furthermore be designed such that the deliverys between inlets/outlets 34, 36 and 35, 37 are different and determine the entire pump delivery e.g. in a ratio of 60/40%. The medium pressurized by the pump is discharged to the transmission via the line 38. According to the invention the pump delivery is regulable by rendering one or more pump poles pressureless. In the present embodiment the pump pole having inlet/outlet 35, 37 can be rendered pressureless by communicating the outlet 37 with the inlet 35. For this purpose a control valve 39 is provided in a line 40, which is connected to the outlet 37. In FIG. 3a the control valve 39 is illustrated in closed condition, so that no fluid is allowed to flow to the line 32 via the line 40. As a result the pump pole with the inlet 35 and the outlet 37 is pressurized and fluid is discharged to the transmission via the line 38. In FIG. 3b the control valve is shown in open condition, however, so that fluid can flow to the line 32 via the line 40 and the control valve 39. Thus the pump pole with the inlet 35 and the outlet 37 has become pressureless, and therefore does not take part in the pump delivery provided by the pump. In order to prevent the fluid of the active pump pole with the inlet 34 and the outlet 36 from flowing out a non-return valve is provided in the connection between the outlet 36 and the outlet 37.

As a result of these measures the pump delivery is regulable. This is illustrated once more in FIG. 3c. The line 42 thereby indicates the delivery provided by the pump in dependence on the rpm if only one pump pole is used, the pole with the inlet 34 and the outlet 36 in this case. Line 43 indicates the delivery supplied by the pump if both pump poles (inlet/outlet 34, 36 and inlet/outlet 35, 37) are operated. As already said before the delivery of the two poles can be selected differently (e.g. 60/40%) by adapting the pump design, so that the angle of inclination of the lines 42 and 43 may vary. FIG. 1 shows an example whereby up to a certain rpm N1 both pumps are connected and whereby above said rpm only one pump pole provides a delivery, as a result of which the entire delivery provided by the pump decreases from D1 to D2, and from there increases along with the rpm again. As a result of this the pump provides a substantially smaller delivery across a certain rpm range than is the case when both pump poles are operative. As a result of this the efficiency loss of the transmission as a result of the pump power consumed has been considerably reduced.

It will be apparent that besides on the basis of the rpm the pump may also be controlled on the basis of a large number of variables, such as the speed of the primary shaft (Np) and or the secondary shaft (Ns) of the transmission, as well as accelerations or decelerations ($\alpha 1$) thereof. When the pump is used in a vehicle corresponding variables such as vehicle speed (V1), engine rpm (Nm), accelerations or decelerations ($\alpha 2$) thereof, as well as the accelerator pedal position ($\beta$) and brake pedal position, or the derivatives in time thereof, can be used. For this purpose electronic, mechanical or hydraulic control means may be used. FIG. 3 shows an electronic control unit with selection means 44, which is fed with one or more of the above variables. Furthermore the line pressure p in the line 13 regulated by the control unit 20 is fed as a variable. The control unit 44 comprises selection means, in whose memory data are stored relating to a certain optimum selection with regard to the manner of regulating the pump delivery in relation to the aforesaid variables to be input as a measure of the specific momentaneous operating condition of the transmission.

Figure 4:
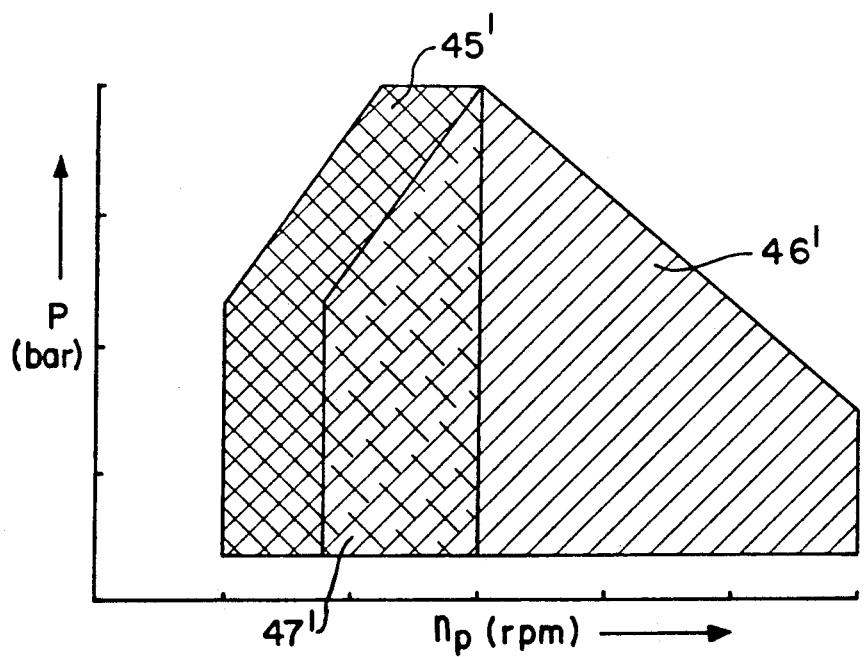
FIG. 4 shows a possible pump characteristic for storage in the memory of the selection means for the transmission according to FIG. 3.

Thus e.g. the pump characteristic according to FIG. 4 may be stored in the memory of the selection means, as a relation between the line pressure p and the rpm Np of the primary shaft. The selection means may thereby be arranged in such a manner that in the range 45' both poles of the pump 31 are used at all times, whilst in the range 46' one single pole of the pump 31 is used at all times. In the intermediate range 47' the selection means may then determine, on the basis of the other variables which are input as a measure of the momentaneous operating conditions of the transmission, whether one or both poles of the pump 31 will be used. Preferably the selection means compare the input value with a limit value or differential value stored in the memory whereby, when said values are exceeded, the control means are activated and the pump delivery is thus adapted. Thus it is possible to compare e.g. the accelerator pedal position or the derivative in time with a stored limit value thereof. Or the required speed of the primary shaft is compared with the actual speed of the primary shaft. When a differential value stored in the memory is exceeded the control means could be activated. The variables may be standardized e.g. by transmission variables with corresponding vehicle variables.

In the embodiment according to FIG. 3 the control unit 44 delivers a signal to an on/off solenoid 45, which is disposed in a line 46. The on/off solenoid 45 may thereby open or close the connection between the line 46 and a line 47 to the control valve 39. As a result the control valve 39 is closed (FIG. 3b), resulting in only one pump pole being used, or opened (FIG. 3a), resulting in both pump poles being used.

It will be apparent that as a result of the described regulation of the delivery provided by the pump the efficiency of the transmission will be considerably enhanced because the pump circulates substantially less fluid, which is not used for the control of the transmission. The illustrated embodiment shows a pump having two pump poles. Otherwise all this is correspondingly applicable to assembled pumps, in which one or more pumps are provided in parallel and one or more pumps may be selectively connected or disconnected or be rendered pressureless. As will be apparent the best regulability is achieved when using a continuously variable pump. The invention is thus not limited to the illustrated embodiment.

I claim:

1. A continuously variable transmission provided with a primary pulley mounted on a primary shaft and a secondary pulley mounted on a secondary shaft, both the primary pulley and the secondary pulley comprising a pair of discs, a least one of said discs being axially movable by means of a hydraulic cylinder so as to adjust the transmission ratio, with a transmission means passed over the pulley, with a pump means for providing a fluid for said hydraulic cylinder, which pump means have a regulable delivery and consist of one or more pump parts/poles, as well as control means to regulate the required pump delivery in dependence on the operating conditions of the transmission characterized in that the control means comprise a control valve, which is disposed in a connecting line between the inlet and outlet of at least one pump part/pole, so as to open casu quo close said connecting line.

2. A continuously variable transmission according to claim 1, characterized in that the control valve is coupled to an on/off solenoid.

3. A continuously variable transmission according to claim 2, characterized in that the on/off solenoid is coupled to an output of selection means.

4. A continuously variable transmission according to claim 2, characterized in that the control means regulate the required pump delivery in dependence on one or more of the following operating conditions: the speed of the primary shaft, the speed of the secondary shaft, as well as acceleration or deceleration thereof, and the line pressure in the transmission.

5. A continuously variable transmission according to claim 1, characterized in that the control means regulate the required delivery in dependence on one or more operating conditions of the vehicle, such as the engine rpm, the vehicle speed, acceleration or deceleration thereof, as well as the accelerator pedal brake pedal positions and the derivatives in time thereof.

6. A continuously variable transmission according to claim 1, characterized in that the control means are mechanical hydraulic control means.

7. A continuously variable transmission according to claim 1, characterized in that the control means are hydraulic means.

8. A continuously variable transmission according to claim 1, characterized in that the control means are electronic control means.

9. A continuously variable transmission according to claim 1, characterized in that the electronic control means comprise selection means—whereby mutually different data are stored in the memory thereof, said data relating to a certain optimum choice with regard to the manner of regulating the pump delivery in relation to the operating conditions of the transmission.

10. A continuously variable transmission according to claim 9, characterized in that the input signal is supplied to an input of the selection means as a measure of the accelerator pedal position ($\beta$) and is compared with a limit value thereof ($\beta$ limit) which is stored in the memory, and that when the limit value is exceeded, the control means can be activated so as to adapt the pump delivery.

11. A continuously variable transmission according to claim 9, characterized in that an input signal is supplied to an input of the selection means as a measure of the change in the accelerator pedal position ($\beta$) and is compared with a limit value thereof ($\beta$ limit), which is stored in the memory, and that when the limit value is exceeded the control means can be activated so as to adapt the pump delivery.

12. A continuously variable transmission according to claim 9, characterized in that an input signal is supplied to an input of the selection means as a measure of the required speed of the primary shaft (Np required) and is compared with an input signal as a measure of the actual speed of the primary shaft (Np actual) and is compared with a differential value which is stored in the memory, and that when said differential value is exceeded the control means can be activated so as to adapt the pump delivery.

13. A continuously variable transmission according claim 12, characterized in that the input signals for the required case quo the actual speed of the primary shaft are standardized for the required and the actual vehicle speed respectively.

14. A continuously variable transmission according claim 9, characterized in that the input signal is supplied to an input of the selection means as a measure of the deceleration of the vehicle and is compared with a deceleration value which is stored in the memory and that when the deceleration value is exceeded the control means can be activated so as to adapt the pump delivery.

15. A continuously variable transmission according claim 9, characterized in that the pump characteristic is stored in the memory of the selection means.

16. A continuously variable transmission according claim 1, characterized in that the pump means is a continuously variable pump.

17. A continuously variable transmission according claim 1, characterized in that the delivery of the pump is regulable in steps.

18. A continuously variable transmission according claim 17, characterized in that the pump is a composite pump with parallel pump parts.

19. A continuously variable transmission according claim 17, characterized in that the pump is multipolar.

20. A continuously variable transmission according claim 19, characterized in that the pump is bipolar.

21. A continuously variable transmission according to any one of the claims 18-20, characterized in that the pump parts/poles each have a different delivery.

* * * * *